United States Patent
Ueno et al.

(10) Patent No.: US 10,606,471 B2
(45) Date of Patent: Mar. 31, 2020

(54) ELECTRONIC DEVICE THAT COMMUNICATES WITH A MOVEMENT DETECTION APPARATUS INCLUDING A BAROMETRIC PRESSURE SENSOR

(71) Applicant: KYOCERA Corporation, Kyoto (JP)

(72) Inventors: Yasuhiro Ueno, Yokohama (JP); Shigeki Tanabe, Yokohama (JP); Hideki Morita, Yokohama (JP); Isao Masuike, Machida (JP); Koutaro Yamauchi, Yokohama (JP); Manabu Sakuma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 20 days.

(21) Appl. No.: 15/709,707

(22) Filed: Sep. 20, 2017

(65) Prior Publication Data

US 2018/0081536 A1    Mar. 22, 2018

(30) Foreign Application Priority Data

Sep. 21, 2016 (JP) .................................. 2016-184352

(51) Int. Cl.
*G06F 3/0488* (2013.01)
*G06F 3/0346* (2013.01)
(Continued)

(52) U.S. Cl.
CPC .......... *G06F 3/04883* (2013.01); *G01L 13/00* (2013.01); *G06F 1/1694* (2013.01);
(Continued)

(58) Field of Classification Search
CPC ............. G06F 3/04883; G06F 3/04845; G06F 3/0346; G06F 3/03545; G06F 2203/04806; G06F 2203/033; G01L 13/00
See application file for complete search history.

(56) References Cited

U.S. PATENT DOCUMENTS

| 5,276,787 A | * | 1/1994 | Searby | G06F 3/04845 |
| | | | | 345/173 |
| 5,571,997 A | * | 11/1996 | Gray | G06F 3/03545 |
| | | | | 178/19.04 |
| 5,974,558 A | * | 10/1999 | Cortopassi | G06F 1/1613 |
| | | | | 713/323 |

(Continued)

FOREIGN PATENT DOCUMENTS

| JP | 2014-026460 A | 2/2014 |
| JP | 2015-225493 A | 12/2015 |
| JP | 2015-228682 A | 12/2015 |

OTHER PUBLICATIONS

An Office Action; "Notice of Reasons for Rejection," mailed by the Japanese Patent Office on Oct. 25, 2016, which corresponds to Japanese Patent Application No. 2016-184352 and is related to the present application; with English language Concise Explanation.

*Primary Examiner* — Amy M Levy
(74) *Attorney, Agent, or Firm* — Studebaker & Brackett PC (57) ABSTRACT

An electronic device includes a communication interface, a display, and a controller that controls screen display of the display. The communication interface communicates with a movement detection apparatus provided with a barometric pressure sensor. The controller enlarges or reduces a screen of the display in accordance with a change in the barometric pressure detected by the barometric pressure sensor. The controller may enlarge the screen if the change is a rise in barometric pressure and reduce the screen if the change is a drop in barometric pressure.

5 Claims, 8 Drawing Sheets

(51) Int. Cl.
*G06F 1/16* (2006.01)
*G01L 13/00* (2006.01)
*G06F 3/0354* (2013.01)
*G06F 3/038* (2013.01)
*G06F 3/0484* (2013.01)

(52) U.S. Cl.
CPC ............ *G06F 3/038* (2013.01); *G06F 3/0346* (2013.01); *G06F 3/0383* (2013.01); *G06F 3/03545* (2013.01); *G06F 3/04845* (2013.01); *G06F 2203/0331* (2013.01); *G06F 2203/04806* (2013.01)

(56) References Cited

U.S. PATENT DOCUMENTS

| | | | | |
|---|---|---|---|---|
| 9,357,493 B1* | 5/2016 | Butler | ............... | H04W 52/0254 |
| 2002/0180763 A1* | 12/2002 | Kung | .................... | G06F 3/0481 |
| | | | | 345/660 |
| 2005/0223342 A1* | 10/2005 | Repka | .................. | G06F 3/0481 |
| | | | | 715/851 |
| 2008/0114614 A1* | 5/2008 | Mahesh | ............. | G06F 3/04883 |
| | | | | 705/2 |
| 2012/0019488 A1* | 1/2012 | McCarthy | ........... | G06F 3/03545 |
| | | | | 345/179 |
| 2013/0093708 A1* | 4/2013 | Annett | .................... | G06F 3/041 |
| | | | | 345/173 |
| 2013/0181948 A1* | 7/2013 | Sakai | .................... | G06F 3/0425 |
| | | | | 345/175 |
| 2013/0257777 A1* | 10/2013 | Benko | ................. | G06F 3/03545 |
| | | | | 345/173 |
| 2014/0055427 A1* | 2/2014 | Kim | .................... | G06F 3/03545 |
| | | | | 345/179 |
| 2014/0198081 A1* | 7/2014 | Mankowski | ........ | G06F 3/03545 |
| | | | | 345/179 |
| 2014/0253522 A1* | 9/2014 | Cueto | ................. | G06F 3/03545 |
| | | | | 345/179 |
| 2014/0267182 A1* | 9/2014 | Fergusson | ........... | G06F 3/03545 |
| | | | | 345/179 |
| 2015/0091815 A1* | 4/2015 | Michaelis | ........... | G06F 3/03545 |
| | | | | 345/173 |
| 2015/0177903 A1* | 6/2015 | Kim | .................... | G06F 3/03545 |
| | | | | 345/156 |
| 2015/0346831 A1 | 12/2015 | Nii | | |
| 2016/0154485 A1* | 6/2016 | Kampt | ................ | G06F 3/03545 |
| | | | | 345/179 |
| 2017/0192493 A1* | 7/2017 | Ofek | ....................... | G06F 3/005 |
| 2017/0212600 A1* | 7/2017 | Koukoumidis | ....... | G06F 3/0488 |
| 2019/0012027 A1* | 1/2019 | Park | ........................ | G06F 3/017 |

* cited by examiner

ELECTRONIC DEVICE THAT COMMUNICATES WITH A MOVEMENT DETECTION APPARATUS INCLUDING A BAROMETRIC PRESSURE SENSOR

CROSS-REFERENCE TO RELATED APPLICATION

This application claims priority to and the benefit of Japanese Patent Application No. 2016-184352 filed Sep. 21, 2016, the entire contents of which are incorporated herein by reference.

TECHNICAL FIELD

This disclosure relates to an electronic device.

BACKGROUND

An electronic device that, for example, uses an infrared sensor to detect a gesture and then processes an input operation corresponding to the gesture has been proposed in recent years.

SUMMARY

An electronic device according to an embodiment of this disclosure includes: a communication interface configured to communicate with a movement detection apparatus including a barometric pressure sensor; a display; and a controller configured to cause the display to display a screen, such that the controller enlarges or reduces the screen on the display in accordance with a change in a barometric pressure detected by the barometric pressure sensor.

An electronic device according to an embodiment of this disclosure includes:
a communication interface configured to communicate with a movement detection apparatus including a barometric pressure sensor and another sensor differing from the barometric pressure sensor; a display; and a controller configured to cause the display to display a screen, such that the controller causes the display to display a line corresponding to a movement of the movement detection apparatus detected by the other sensor, and the controller changes a thickness of the line on the display in accordance with a change in a barometric pressure detected by the barometric pressure sensor.

An electronic device according to an embodiment of this disclosure includes: a first barometric pressure sensor; a communication interface configured to communicate with a movement detection apparatus including a second barometric pressure sensor; and a controller configured to switch between a first mode and a second mode with lower power consumption than the first mode, such that the controller switches from the second mode to the first mode if a difference between a barometric pressure detected by the first barometric pressure sensor and a barometric pressure detected by the second barometric pressure sensor is smaller than a predetermined value.

The electronic device according to one of the embodiments of this disclosure is more convenient.

BRIEF DESCRIPTION OF THE DRAWINGS

In the accompanying drawings.

DETAILED DESCRIPTION

Figure 1:
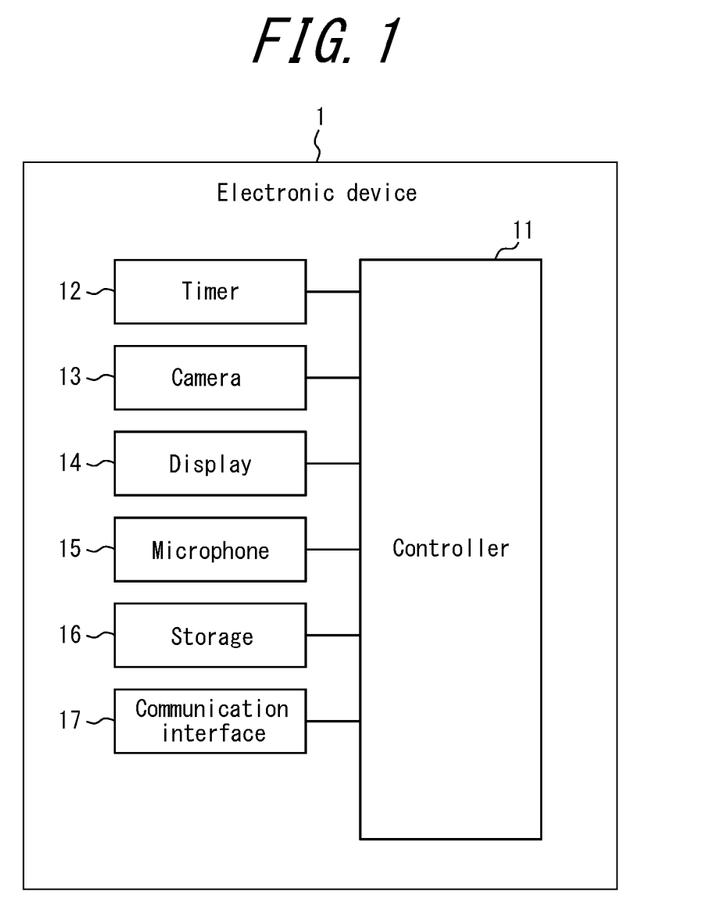
FIG. 1 is a configuration diagram of an electronic device according to one embodiment.

[Embodiment 1]
(Configuration of Electronic Device)
The electronic device 1 according to one embodiment illustrated in FIG. 1 includes a display 14, a storage 16, a communication interface 17, and a controller 11. The electronic device 1 further includes a timer 12, a camera 13, and a microphone 15. FIG. 1 is only an example, and the electronic device 1 need not include every component in FIG. 1. Also, the electronic device 1 may include components other than those illustrated in FIG. 1. For example, the electronic device 1 may include a UV sensor capable of measuring the amount of ultraviolet light included in sunlight or other light. The electronic device 1 may, for example, also include an illumination sensor that detects the intensity of surrounding light.

The display 14 displays a screen. The screen includes, for example, at least one of characters, images, symbols, graphics, and the like. The display 14 may be a liquid crystal display, an organic electro-luminescence panel, an inorganic electro-luminescence panel, or the like. In this embodiment, the display 14 is integrated with a touchscreen to constitute a touch panel. The touchscreen detects contact by a finger, a stylus, or other object and identifies the contact position. The touchscreen integrated with the display 14 can simultaneously detect a plurality of positions contacted by fingers, styluses, or other objects.

The storage 16 functions as a memory storing programs and data. The storage 16 temporarily stores the processing result of the controller 11. The storage 16 may include any storage device, such as a semiconductor storage device or a magnetic storage device. The storage 16 may also include a plurality of types of storage devices. The storage 16 may include a combination of a portable storage medium, such as a memory card, and an apparatus for reading the storage medium.

The programs stored in the storage 16 include applications that run in the foreground or the background and a control program that supports operations of the applications. For example, the applications cause the controller 11 to execute processing to display predetermined information on the display 14. The control program may, for example, be an operating system (OS). The applications and control program may be installed on the storage 16 by communication with the communication interface 17 or from a storage medium.

The communication interface 17 is for communicating over a wired or wireless connection. The communication method of the communication interface 17 in one embodiment is prescribed by a wireless communication standard. For example, a cellular phone communication standard such as 2G, 3G, or 4G may be used as the wireless communication standard. Examples of cellular phone communication standards include long term evolution (LTE), wideband code division multiple access (W-CDMA), CDMA2000, personal digital cellular (PDC), global system for mobile communications (GSM® (GSM is a registered trademark in Japan, other countries, or both)), and personal handy-phone system (PHS). Examples of wireless communication standards include worldwide interoperability for microwave access (WiMAX), IEEE802.11, Bluetooth® (Bluetooth is a registered trademark in Japan, other countries, or both), infrared data association (IrDA), and near field communication (NFC). The communication interface 17 may support one or more of the aforementioned communication standards. In this embodiment, the communication interface 17 communicates with the communication interface 37 of the movement detection apparatus 2 illustrated in FIG. 2 using Bluetooth®. The electronic device 1 pairs with the movement detection apparatus 2 at the start of communication to create a stable communication environment.

The controller 11 is a processor such as a central processing unit (CPU). The controller 11 may be a system-on-a-chip (SoC) or other type of integrated circuit in which other components are integrated. The controller 11 may be configured by combining a plurality of integrated circuits. The controller 11 implements a variety of functions by comprehensively controlling operations of the electronic device 1.

In greater detail, the controller 11 refers as necessary to data stored in the storage 16. The controller 11 implements a variety of functions by executing instructions included in programs stored in the storage 16 to control other functional components, such as the display 14.

As described below, the controller 11 controls the screen displayed on the display 14 in accordance with a user movement detected by the movement detection apparatus 2.

The timer 12 receives an instruction for a timer operation from the controller 11. Once a predetermined time has elapsed, the timer 12 outputs a signal indicating that the time has elapsed to the controller 11. The timer 12 may be provided external to the controller 11, as illustrated in FIG. 1, or may be included within the controller 11.

The camera 13 captures images of subjects around the electronic device 1. One example of the camera 13 is a front camera provided on the same face as the display 14 of the electronic device 1.

The microphone 15 detects sounds around the electronic device 1, including people's voices.

(Configuration of Movement Detection Apparatus)

Figure 2:
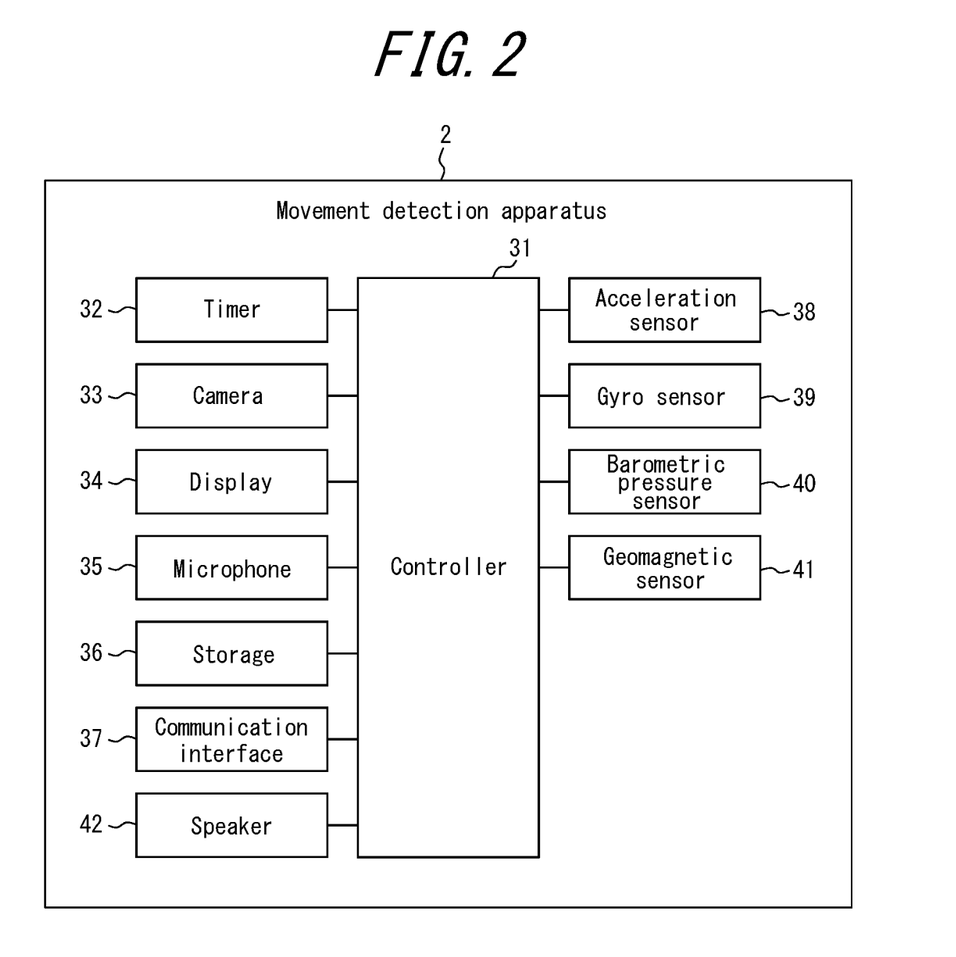
FIG. 2 is a configuration diagram of a movement detection apparatus that communicates with an electronic device.

The movement detection apparatus 2 illustrated in FIG. 2 communicates with the electronic device 1 and outputs data used to control the electronic device 1. The movement detection apparatus 2 is also a type of electronic device but is referred to by this name in this disclosure to distinguish it from the electronic device 1. The movement detection apparatus 2 includes a storage 36, a communication interface 37, an acceleration sensor 38, a gyro sensor 39, a barometric pressure sensor 40, and a controller 31. The movement detection apparatus 2 further includes a timer 32, a camera 33, a display 34, a microphone 35, a geomagnetic sensor 41, and a speaker 42. FIG. 2 is only an example, and the movement detection apparatus 2 need not include every component in FIG. 2. Also, the movement detection apparatus 2 may include components other than those illustrated in FIG. 2. In this embodiment, the motion sensor that detects the user's movements is configured by the acceleration sensor 38, the gyro sensor 39, and the barometric pressure sensor 40.

The storage 36 functions as a memory storing programs and data. The storage 36 temporarily stores the processing result of the controller 31. The storage 36 may include any storage device, such as a semiconductor storage device or a magnetic storage device. The storage 36 may also include a plurality of types of storage devices. The storage 36 may include a combination of a portable storage medium, such as a memory card, and an apparatus for reading the storage medium.

The programs stored in the storage 36 include applications that run in the foreground or the background and a control program that supports operations of the applications. For example, the applications cause the controller 31 to execute processing to display information from the electronic device 1 on the display 34. The control program is, for example, a battery management program that manages the remaining amount of a battery. The applications and control program may be installed on the storage 36 by communication with the communication interface 37 or from a storage medium.

The communication interface 37 is for communicating over a wired or wireless connection. The communication method of the communication interface 37 in one embodiment is prescribed by a wireless communication standard. The communication interface 37 may support one or more of the communication standards described with regard to the communication interface 17 of the electronic device 1. In this embodiment, the communication interface 37 communicates with the communication interface 17 of the electronic device 1 using Bluetooth®.

The acceleration sensor 38 detects the direction and magnitude of acceleration acting on the movement detection apparatus 2. The acceleration sensor 38 is a three-axis (3D) sensor that detects acceleration in the x-axis, y-axis, and z-axis directions. The acceleration sensor 38 may be of any type. The acceleration sensor 38 may, for example, be a piezoresistive type. Alternatively, the acceleration sensor 38 may be a capacitive type. The acceleration sensor 38 may also, for example, be a piezoelectric element (piezoelectric type) or thermal detection type of microelectromechanical system (MEMS). The acceleration sensor 38 may also, for example, be a servo-type of sensor that moves a moveable coil and returns the coil by feedback current. Furthermore, the acceleration sensor 38 may be a strain-gauge type of sensor that uses a strain gauge to measure strain generated by acceleration.

The gyro sensor 39 detects the angular velocity of the movement detection apparatus 2. The gyro sensor 39 is, for example, a three-axis vibration gyro sensor that detects the angular velocity from deformation of a structure due to the Coriolis force acting on a vibrated arm. This structure may, for example, be made of a piezoelectric material such as crystal or piezoelectric ceramic. The gyro sensor 39 may also be formed by MEMS technology using silicon material or the like for the structure. Furthermore, the gyro sensor 39 may be an optical gyro sensor. The controller 31 can measure the orientation of the movement detection apparatus 2 by integrating the angular velocity, acquired by the gyro sensor 39, over time once.

The barometric pressure sensor 40 detects the barometric pressure (atmospheric pressure) outside of the movement detection apparatus 2. The barometric pressure sensor 40 is, for example, a resistance change type of sensor that converts the change in barometric pressure to a resistance value. The barometric pressure sensor 40 may, for example, be a capacitance type of sensor that converts the change in barometric pressure to an electrostatic charge. The barometric pressure sensor 40 may also, for example, be a crystal oscillation frequency type sensor that converts the change in pressure to an oscillation frequency. In this embodiment, the barometric pressure sensor 40 has a resolution allowing detection of the change in barometric pressure over a height of several centimeters.

The controller 31 is a processor such as a central processing unit (CPU). The controller 31 may be a system-on-a-chip (SoC) or other type of integrated circuit in which other components are integrated. The controller 31 may be configured by combining a plurality of integrated circuits. The controller 31 implements a variety of functions by comprehensively controlling operations of the movement detection apparatus 2. In greater detail, the controller 31 refers as necessary to data stored in the storage 36. The controller 31 implements a variety of functions by executing instructions included in programs stored in the storage 36 to control other functional components, such as the communication interface 37.

The geomagnetic sensor 41 detects the orientation of the earth's magnetism. For example, the component when the orientation of the movement detection apparatus 2 is projected onto a plane parallel to the ground is the orientation information acquired by the geomagnetic sensor 41. The orientation information acquired by the geomagnetic sensor 41 is the direction of the movement detection apparatus 2.

The speaker 42 outputs sound. For example, the other person's voice during a hands-free call or the content of an e-mail that is read aloud is output as sound from the speaker 42.

The timer 32, camera 33, display 34, and microphone 35 are respectively the same as the timer 12, camera 13, display 14, and microphone 15 of the electronic device 1.

(Operations of Electronic Device)

Figure 3:
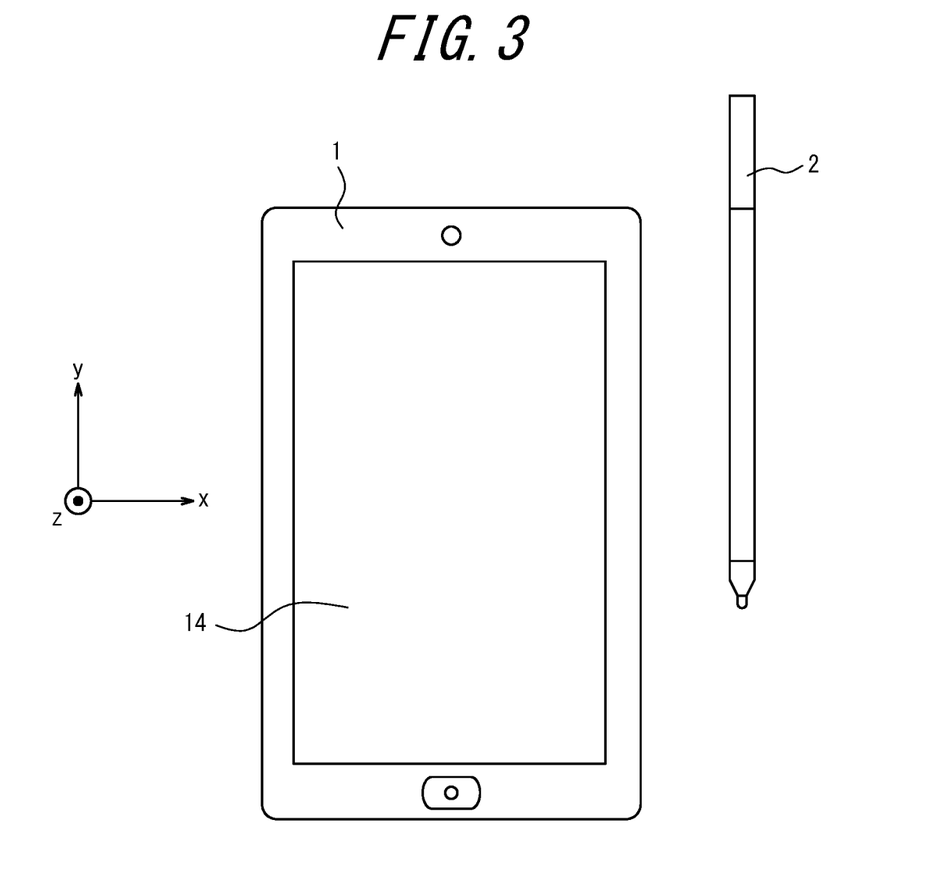
FIG. 3 illustrates an example of the appearance of an electronic device and a movement detection apparatus according to one embodiment.

The electronic device 1 in FIG. 3 is a tablet. Alternatively, the electronic device 1 may be a mobile phone terminal, a phablet, a personal digital assistant (PDA), a game device, an electronic book reader, a household appliance, an industrial device (factory automation (FA) device), or the like. The electronic device 1 includes the display 14. In this embodiment, the display 14 is integrated with a touchscreen to constitute a touch panel. The touchscreen detects contact by a finger, a stylus, or other object and identifies the contact position.

The movement detection apparatus 2 in FIG. 3 is a stylus. In this embodiment, the movement detection apparatus 2 is a pen-shaped device that the user can grasp. Alternatively, the movement detection apparatus 2 may be a ring-type wearable terminal that can be worn on a finger. Using the movement detection apparatus 2, the user can draw on the touch panel. At this time, the movement detection apparatus 2 may be at a distance from the touch panel of the electronic device 1. The electronic device 1 and the movement detection apparatus 2 illustrated in FIG. 3 may, for example, be used as an educational tablet or as a digitizer. As illustrated in FIG. 3, the z-axis direction is the height direction perpendicular to the display 14 of the electronic device 1. The xy-plane defined by the x-axis and the y-axis is parallel to the display 14.

To enlarge or reduce the screen displayed on the display 14, the user typically performs an operation such as a pinch-in or a pinch-out. At this time, the user needs to release the fingers from the stylus. Also, to change the thickness of the line drawn with the stylus, the user typically needs to perform an operation to change a setting on a menu screen. At this time, the user temporarily needs to suspend the operation in progress. The electronic device 1 and movement detection apparatus 2 of this embodiment execute the following processing, described with reference to FIGS. 4 and 5, in conjunction. With this processing, the user can efficiently enlarge or reduce the screen and change the line thickness.

(Processing on Electronic Device Side)

Figure 4:
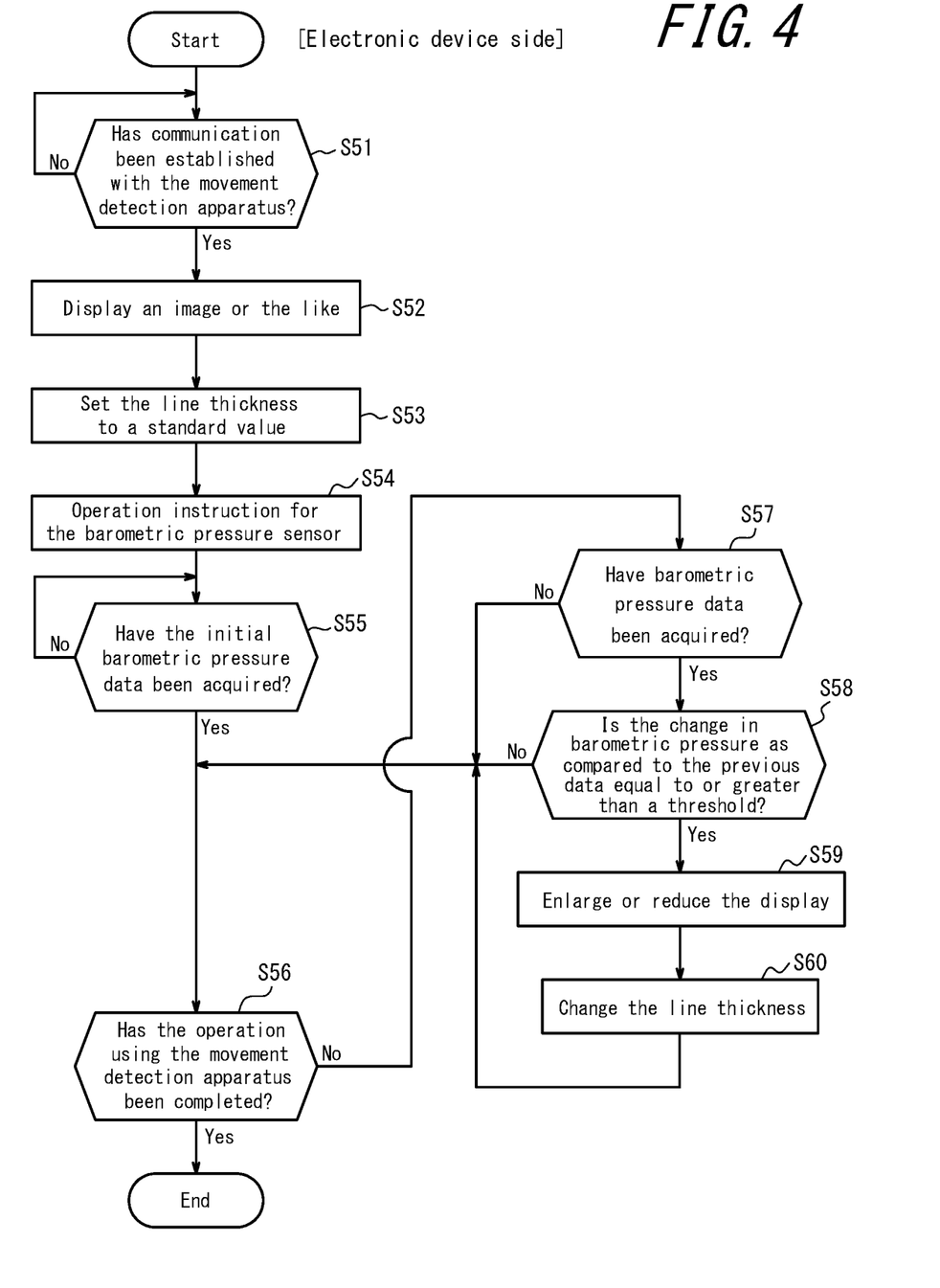
FIG. 4 is a flowchart illustrating an example of enlargement and reduction processing executed by an electronic device according to one embodiment.

FIG. 4 is a flowchart illustrating an example of display processing executed by the electronic device 1. First, the controller 11 establishes communication with the movement detection apparatus 2. The controller 11 stands by until successfully pairing with the movement detection apparatus 2 (step S51: No). Upon pairing with the movement detection apparatus 2, the controller 11 proceeds to the processing in step S52 (step S51: Yes).

Once pairing with the movement detection apparatus 2 is complete, the controller 11 displays an image or the like (step S52). The image or the like indicates a region for the user to draw in, a menu, or the like. For example, the image or the like may be a startup screen of paint software (a paint application).

The controller 11 sets the line thickness of characters or graphics that the user draws to a standard value (such as 12 points) (step S53). Here, the controller 11 can cause the display 14 to display a line corresponding to a movement of the movement detection apparatus 2 detected by a sensor other than the barometric pressure sensor 40 (for example, at least one of the acceleration sensor 38, gyro sensor 39, and geomagnetic sensor 41).

The controller 11 outputs an operation instruction for the barometric pressure sensor to the movement detection apparatus 2 (step S54). The operation instruction for the barometric pressure sensor is a control signal to cause the barometric pressure sensor 40 to operate. From the value of the barometric pressure detected by the barometric pressure sensor 40, the controller 11 can recognize the height of the movement detection apparatus 2 (a stylus in this example). At this time, the controller 11 may also output an operation instruction for another sensor to the movement detection apparatus 2. When causing another sensor to operate, the controller 11 also acquires the detected data from the other sensor, like the below-described barometric pressure data.

The controller 11 stands by until acquiring the initial barometric pressure data from the movement detection apparatus 2 (step S55: No). The height of the movement detection apparatus 2 indicated by the initial barometric pressure data becomes a reference point. At this time, the controller 11 may treat the height of the reference point as zero and calculate the relative height during the subsequent processing. Upon acquiring the initial barometric pressure data from the movement detection apparatus 2 (step S55: Yes), the controller 11 proceeds to the processing in step S56.

The controller 11 determines whether the operation using the movement detection apparatus 2 has been completed (step S56). For example, when detecting that the user has pressed the close button of the currently running application, the controller 11 determines that the operation using the movement detection apparatus 2 has been completed and ends the sequence of processing (step S56: Yes). When determining that the operation using the movement detection apparatus 2 has not been completed, the controller 11 proceeds to the processing in step S57.

Upon acquiring the barometric pressure data from the movement detection apparatus 2 (for the second time onward) (step S57: Yes), the controller 11 proceeds to the processing in step S58. When barometric pressure data have not been acquired from the movement detection apparatus 2 (step S57: No), the controller 11 returns to the processing in step S56.

Upon acquiring new barometric pressure data, the controller 11 determines whether the change in barometric pressure as compared to the previous data is equal to or greater than a threshold (step S58). As described above, the barometric pressure sensor 40 has a resolution allowing detection of the change in barometric pressure over a height of several centimeters. The threshold may, for example, be the value of a change in barometric pressure corresponding to a difference in height of two centimeters. If the difference in barometric pressure as compared to the previous data is equal to or greater than the threshold (step S58: Yes), the controller 11 determines that the height of the movement detection apparatus 2 (a stylus in this example) has changed greatly and then proceeds to the processing in step S59. If the change in barometric pressure as compared to the previous data is less than the threshold (step S58: No), the controller 11 returns to the processing in step S56.

In accordance with the change in barometric pressure detected by the barometric pressure sensor, the controller 11 enlarges or reduces the display screen of the display 14 (step S59). In this embodiment, the controller 11 enlarges the screen if the change is a rise in barometric pressure (i.e. if the movement detection apparatus 2 is moved downward along the z-axis, closer to the ground). The controller 11 reduces the screen if the change is a drop in barometric pressure (i.e. if the movement detection apparatus 2 is moved upward along the z-axis, away from the ground). At this time, the enlargement ratio or reduction ratio may increase as the change in barometric pressure is greater.

Alternatively, the correspondence between the rise and drop in barometric pressure and the enlargement and reduction of the screen may be the opposite of the above example. In other words, the controller 11 may reduce the screen if the change is a rise in barometric pressure (i.e. if the movement detection apparatus 2 is moved downward along the z-axis, closer to the ground). Also, the controller 11 may enlarge the screen if the change is a drop in barometric pressure (i.e. if the movement detection apparatus 2 is moved upward along the z-axis, away from the ground).

The controller 11 then changes the thickness of the line drawn with the stylus in accordance with the change in barometric pressure detected by the barometric pressure sensor 40 (step S60) and returns to the processing in step S56. In this embodiment, the controller 11 increases the line thickness if the change is a rise in barometric pressure (i.e. if the movement detection apparatus 2 is moved downward along the z-axis, closer to the ground). The controller 11 reduces the line thickness if the change is a drop in barometric pressure (i.e. if the movement detection apparatus 2 is moved upward along the z-axis, away from the ground). At this time, the change in thickness may increase as the change in barometric pressure is greater.

Alternatively, the correspondence between the rise and drop in barometric pressure and the increase or decrease in line thickness may be the opposite of the above example. In other words, the controller 11 may reduce the line thickness if the change is a rise in barometric pressure (i.e. if the movement detection apparatus 2 is moved downward along the z-axis, closer to the ground). Also, the controller 11 may increase the line thickness if the change is a drop in barometric pressure (i.e. if the movement detection apparatus 2 is moved upward along the z-axis, away from the ground).

(Processing on Movement Detection Apparatus Side)

Figure 5:
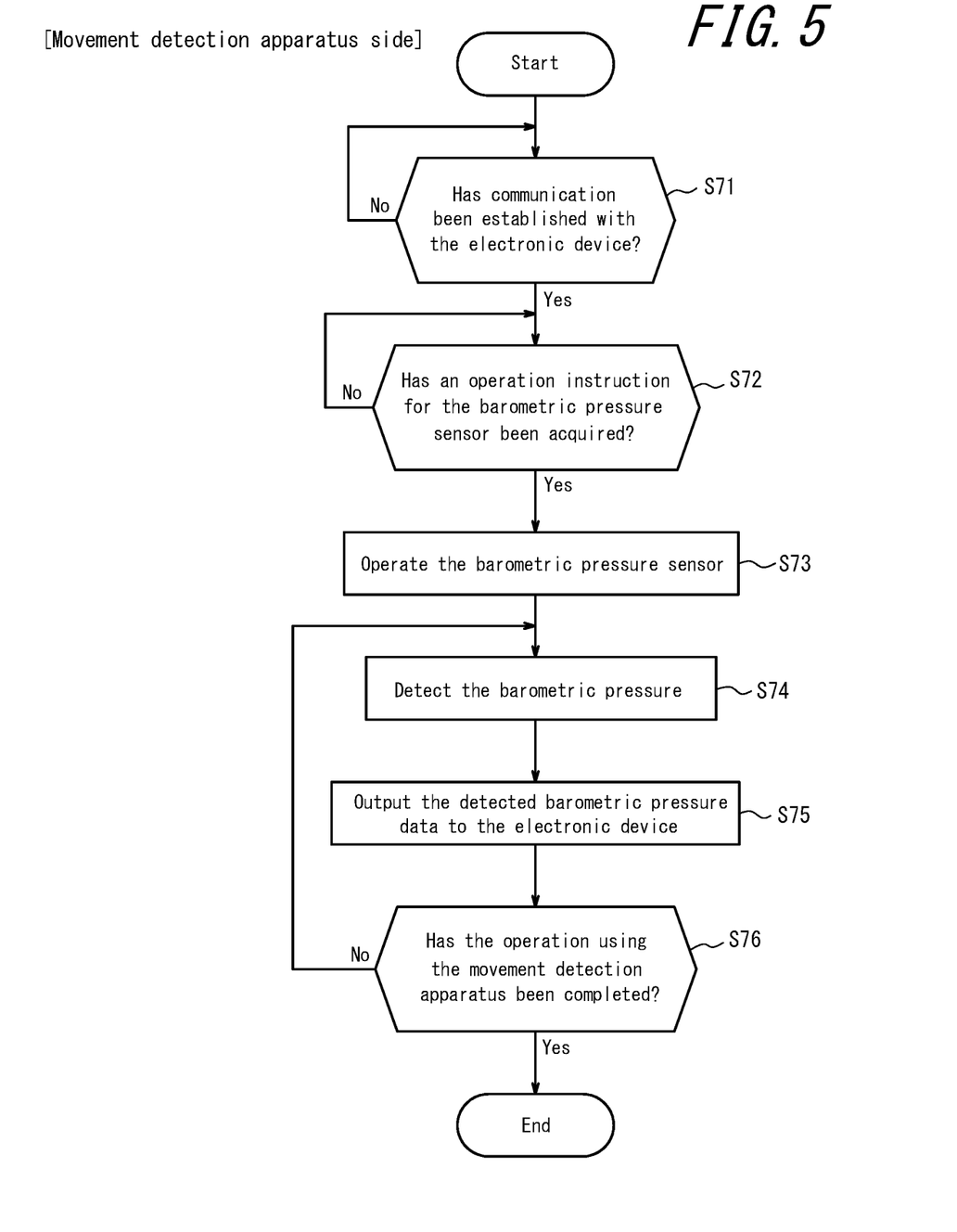
FIG. 5 is a flowchart illustrating an example of enlargement and reduction processing executed by the movement detection apparatus that communicates with the electronic device.

FIG. 5 is a flowchart illustrating an example of user movement detection processing executed by the movement detection apparatus 2. The movement detection apparatus 2 executes the following processing in conjunction with the processing executed by the electronic device 1 (FIG. 4).

First, the controller 31 of the movement detection apparatus 2 stands by until communication is established with the electronic device 1 (step S71: No). Once communication is established with the electronic device 1, the controller 31 proceeds to the processing in step S72 (step S71: Yes).

The controller 31 stands by until acquiring an operation instruction for the barometric pressure sensor from the electronic device 1 (step S72: No). Upon acquiring an operation instruction for the barometric pressure sensor (step S72: Yes), the controller 31 causes the barometric pressure sensor 40 to operate in order to detect the height of the movement detection apparatus 2 (stylus) (step S73).

The controller 31 causes the barometric pressure sensor 40 to detect the barometric pressure (step S74). The controller 31 outputs the data of the detected barometric pressure to the electronic device 1 (step S75). Here, the controller 31 may cause the barometric pressure sensor 40 to detect the barometric pressure periodically (for example, once per second) or at predetermined times.

The controller 31 determines whether the operation using the movement detection apparatus 2 has been completed (step S76). For example, when notified by the electronic device 1 that the user has pressed the close button of the currently running application, the controller 31 determines that the operation has been completed and ends the sequence of processing (step S76: Yes). When determining that the operation using the movement detection apparatus 2 has not been completed, the controller 31 returns to the processing in step S74.

As described above, the electronic device 1 uses the communication interface 17 to communicate with the movement detection apparatus 2, which includes the barometric pressure sensor 40. In accordance with the change in barometric pressure detected by the barometric pressure sensor 40, the controller 11 of the electronic device 1 enlarges or reduces the screen of the display 14. The controller 11 also causes the display 14 to display a line corresponding to a movement of the movement detection apparatus 2 detected by another sensor (for example, at least one of the acceleration sensor 38, gyro sensor 39, and geomagnetic sensor 41) and changes the line thickness in accordance with the change in barometric pressure detected by the barometric pressure sensor 40. As compared to an electronic device that uses a proximity sensor, the electronic device 1 can be operated by a gesture (to enlarge or reduce the screen, to change the line thickness, and so forth) from a more distant location. The electronic device 1 can thus be made more convenient.

Furthermore, in this embodiment, the controller 11 enlarges or reduces the display screen of the display 14 in accordance with the change in barometric pressure detected by the barometric pressure sensor 40. Accordingly, the user can enlarge or reduce the screen without releasing the stylus (movement detection apparatus 2) from the fingers. In this embodiment, in accordance with the change in barometric pressure detected by the barometric pressure sensor 40, the controller 11 also changes the thickness of a line drawn using the stylus (movement detection apparatus 2). Consequently, the user does not need to transition from a working screen to a menu screen in order to change the line thickness, thus allowing the user to enlarge or reduce the screen and change the line thickness efficiently. The electronic device 1 can therefore be made even more convenient. Screen enlargement and reduction and the change in line thickness are performed in conjunction in this embodiment, but only one (screen enlargement/reduction or change in line thickness) may be performed instead.

(Modification)

The movement detection apparatus 2 may be an electronic device (for example, a smartphone) that includes a large-size display 34 (for example, six inches or greater). In the below-described modification, the movement detection apparatus 2 is a smartphone that enlarges or reduces the screen displayed on the display 34. At this time, the movement detection apparatus 2 may operate in conjunction with an electronic device 1 (tablet). The processing to enlarge or reduce the screen of the display 34, however, can be executed independently by the movement detection apparatus 2. Therefore, only the processing of the movement detection apparatus 2 is described below.

Figure 6:
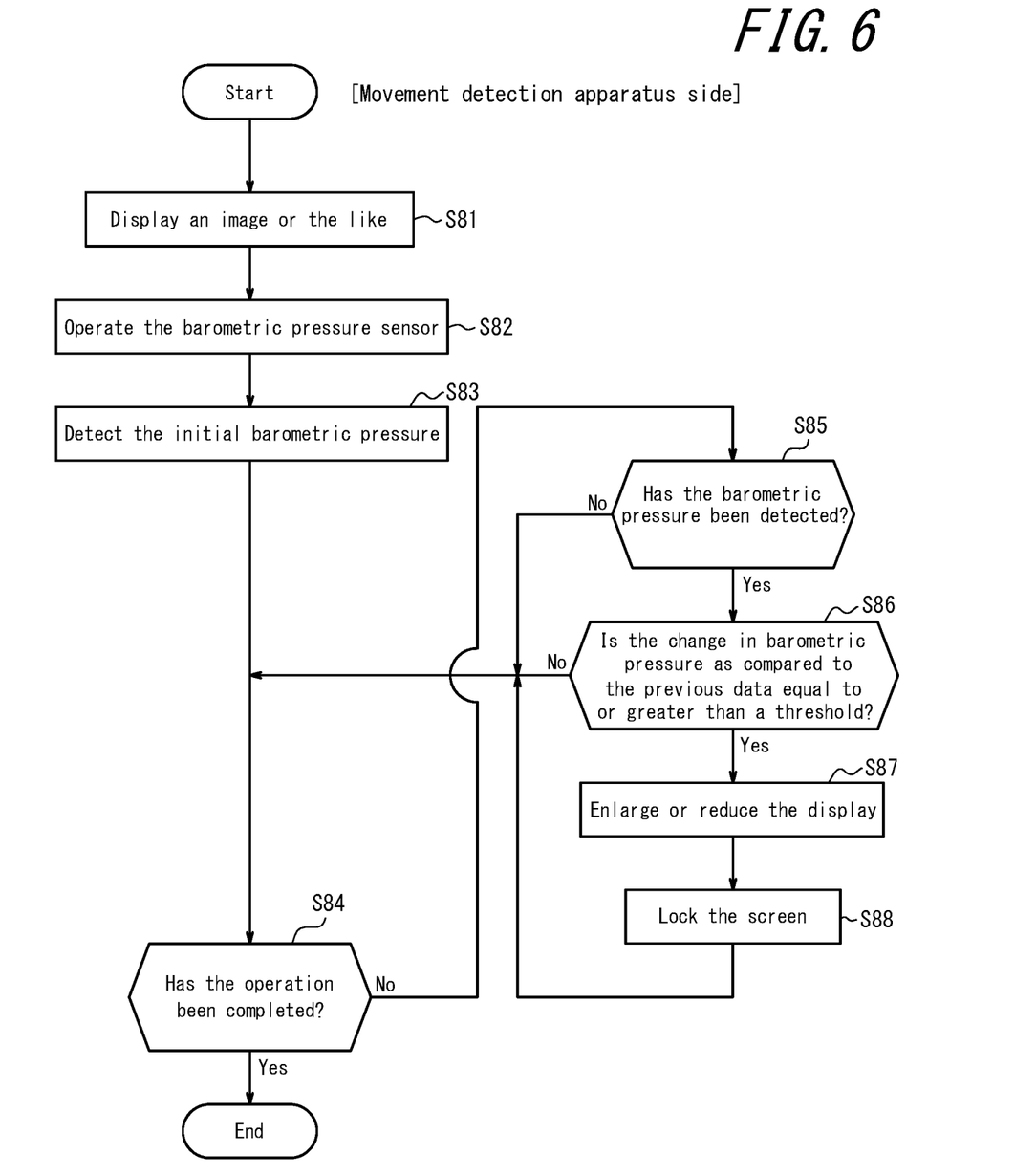
FIG. 6 is a flowchart illustrating another example of enlargement and reduction processing executed by the movement detection apparatus.

FIG. 6 is a flowchart illustrating an example of processing executed by the movement detection apparatus 2, i.e. user movement detection processing and processing to enlarge or reduce the screen of the display 34.

First, the controller 31 of the movement detection apparatus 2 (a smartphone in this example) displays an image on the display 34 (step S81). For example, the movement detection apparatus 2 launches an application that displays a map and then displays the map on the display 34.

The controller 31 then causes the barometric pressure sensor 40 to operate in order to detect the height of the movement detection apparatus 2 (step S82).

The controller 31 causes the barometric pressure sensor 40 to detect the initial barometric pressure (step S83). The height of the movement detection apparatus 2 indicated by the initial barometric pressure data becomes a reference point. At this time, the controller 31 may treat the height of the reference point as zero and calculate the relative height during the subsequent processing.

The controller 31 determines whether the operation using the movement detection apparatus 2 has been completed (step S84). For example, when detecting that the user has closed the application displaying a map, the controller 31 determines that the operation has been completed and ends the sequence of processing (step S84: Yes). The controller 31 proceeds to the processing in step S85 when determining that the operation has not been completed.

The controller 31 causes the barometric pressure sensor 40 to detect the barometric pressure (for the second time onward) and acquires the detected data. When the barometric pressure is detected (step S85: Yes), the controller 31 proceeds to the processing in step S86. When new barometric pressure is not detected (step S85: No), the controller 31 returns to the processing in step S84.

Upon acquiring new barometric pressure data, the controller 31 determines whether the change in barometric pressure as compared to the previous data is equal to or greater than a threshold (step S86). If the change in barometric pressure as compared to the previous data is equal to or greater than the threshold (step S86: Yes), the controller 31 proceeds to the processing in step S87. If the change in barometric pressure as compared to the previous data is less than the threshold (step S86: No), the controller 31 returns to the processing in step S84.

In accordance with the change in barometric pressure detected by the barometric pressure sensor, the controller 31 enlarges or reduces the display screen (map) of the display 34 (step S87). The controller 31 enlarges the screen if the change is a rise in barometric pressure (i.e. if the movement detection apparatus 2 is moved downward along the z-axis, closer to the ground). The controller 31 reduces the screen if the change is a drop in barometric pressure (i.e. if the movement detection apparatus 2 is moved upward along the z-axis, away from the ground). Alternatively, the correspondence between the rise and drop in barometric pressure and the enlargement and reduction of the screen may be the opposite of the above example. The enlargement ratio or reduction ratio may also increase as the change in barometric pressure is greater.

The controller 31 locks the scale (display magnification) of the display screen after enlargement or reduction (step S88). The scale of the locked display screen is subsequently maintained for a predetermined length of time (for example, three seconds) even if the height of the movement detection apparatus 2 changes. By locking the screen, the scale of the screen can be prevented from being changed erroneously (i.e. returned to the display magnification before enlargement or reduction) even if the user puts the movement detection apparatus 2 back in place after enlarging or reducing the screen. A screen change other than scaling is still possible in this case. For example, even if the scale of the display screen is locked, the user can scroll the screen vertically or horizontally. Alternatively, the screen of the display 34 may be locked when a predetermined condition is satisfied. For example, the predetermined condition may be that another sensor (other than the barometric pressure sensor 40, such as the acceleration sensor 38) detects that the user has shaken the movement detection apparatus 2.

[Embodiment 2]

An electronic device 1 according to Embodiment 2 is described below with reference to FIGS. 7 and 8. In this embodiment, the electronic device 1 is made even more convenient with the below-described processing.

(Configuration of Electronic Device)

Figure 7:
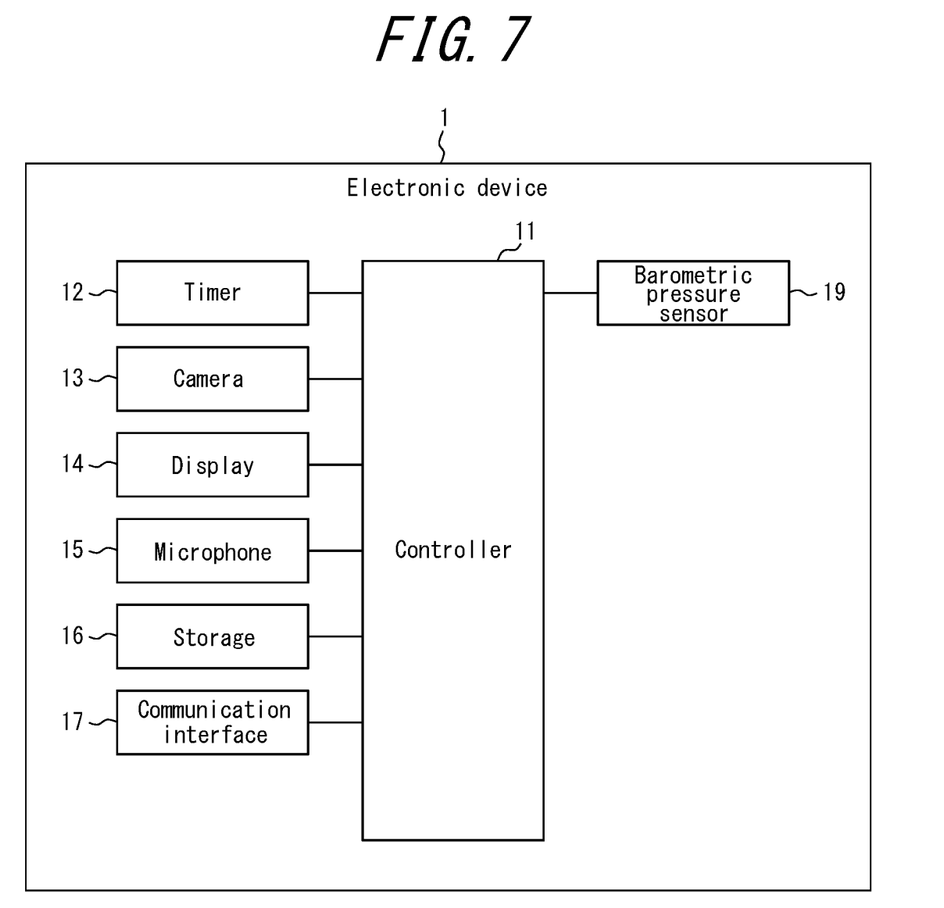
FIG. 7 is another configuration diagram of an electronic device according to one embodiment.

As illustrated in FIG. 7, the electronic device 1 of this embodiment includes a barometric pressure sensor 19 in addition to the configuration of the electronic device 1 according to Embodiment 1. In particular when distinguishing between sensors, the barometric pressure sensor 19 is referred to as the first barometric pressure sensor, and the barometric pressure sensor 40 of the movement detection apparatus 2 is referred to as the second barometric pressure sensor. Since the remaining configuration of the electronic device 1 is the same as in Embodiment 1, a description thereof is omitted. Also, since the configuration of the movement detection apparatus 2 is the same as in Embodiment 1, a description thereof is omitted.

As in Embodiment 1, the electronic device 1 is a tablet. The movement detection apparatus 2 is a stylus (see FIG. 3). As in Embodiment 1, the controller 11 of the electronic device 1 enlarges or reduces the screen. With the processing described with reference to FIG. 8, the electronic device 1 of this embodiment improves the operability when enlarging or reducing the screen and can also manage power.

(Processing on Electronic Device Side)

The electronic device 1 has a first mode and a second mode. Modes refer to operation modes (operation states, operation statuses) that, for example, place restrictions on the operations of the entire electronic device 1. Only one mode can be selected at a time. In this embodiment, the second mode is a low power mode. The low power mode is a mode for operating the controller 11 at low speed to extend battery life. On the other hand, the first mode is a regular operation mode (regular mode).

Figure 8:
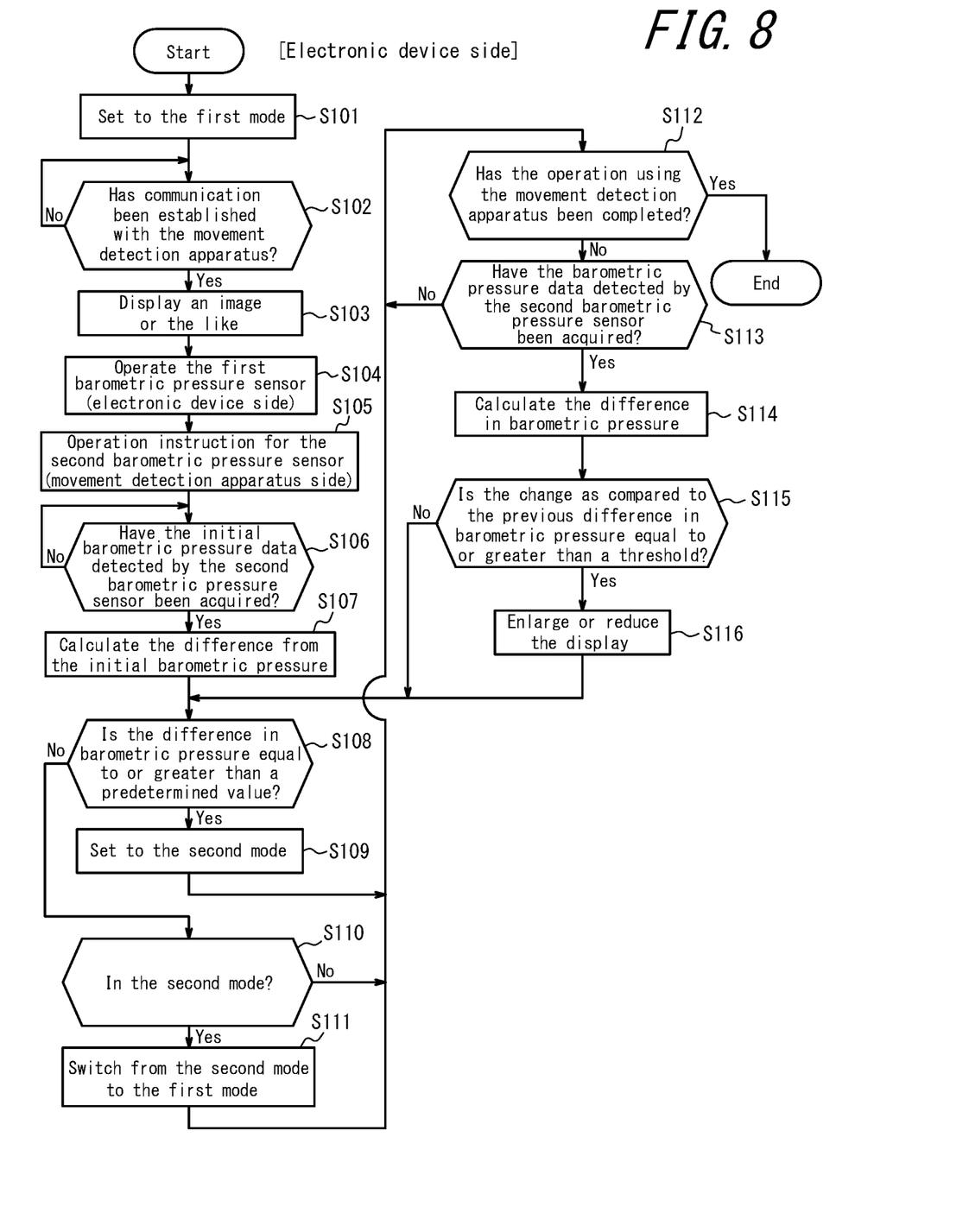
FIG. 8 is a flowchart illustrating another example of enlargement and reduction processing executed by an electronic device according to one embodiment.

FIG. 8 is a flowchart illustrating an example of rendering processing executed by the electronic device 1. First, the controller 11 sets the mode of the electronic device 1 to the first mode (regular mode) (step S101). The controller 11 then establishes communication with the movement detection apparatus 2. The controller 11 stands by until successfully pairing with the movement detection apparatus 2 (step S102: No). Upon pairing with the movement detection apparatus 2, the controller 11 proceeds to the processing in step S103 (step S102: Yes).

Once pairing with the movement detection apparatus 2 is complete, the controller 11 displays an image or the like (step S103). The image or the like is the same as in Embodiment 1.

The controller 11 then causes the barometric pressure sensor 19 (first barometric pressure sensor) to operate in order to detect the height of the electronic device 1 (step S104). The controller 11 then issues an instruction for operation of the barometric pressure sensor 40 (second barometric pressure sensor) of the movement detection apparatus 2 (step S105). From the value of the barometric pressure detected by the barometric pressure sensor 40, the controller 11 can recognize the height of the movement detection apparatus 2 (a stylus in this example).

The controller 11 stands by until acquiring the initial barometric pressure data from the movement detection apparatus 2 (step S106: No). Upon acquiring the initial barometric pressure data, detected by the barometric pressure sensor 40, of the movement detection apparatus 2 (step S106: Yes), the controller 11 calculates the difference from the initial barometric pressure data, detected by the barometric pressure sensor 19, of the electronic device 1 (step S107). In other words, the controller 11 calculates the difference between the initial barometric pressures.

If the difference in barometric pressure is a predetermined value or greater (step S108: Yes), the controller 11 sets the mode of the electronic device 1 to the second mode (low power mode) (step S109). Here, the predetermined value is a barometric pressure difference that corresponds to a height of approximately 30 cm. When the electronic device 1 (tablet) and the movement detection apparatus 2 (stylus) are separated by a height of approximately 30 cm, the controller 11 determines that the electronic device 1 is not in use and transitions to the low power mode. For example, when the user is thinking with the electronic device 1 (tablet) sitting on a desk and the movement detection apparatus 2 (stylus) in hand, the tablet and stylus could be separated by a height of approximately 30 cm. The controller 11 then proceeds to the processing in step S112.

When the difference between the barometric pressure detected by the barometric pressure sensor 19 (first barometric pressure sensor) and the barometric pressure detected by the barometric pressure sensor 40 (second barometric pressure sensor) is less than the predetermined value (step S108: No), the controller 11 determines whether the electronic device 1 is in the second mode (step S110). When the electronic device 1 is in the second mode (step S110: Yes), the controller 11 switches from the second mode to the first mode (regular mode) (step S111) and proceeds to the processing in step S112. If the electronic device 1 is not in the second mode (step S110: No), the controller 11 proceeds to the processing in step S112.

The controller 11 determines whether the operation using the movement detection apparatus 2 has been completed (step S112). For example, when detecting that the user has pressed the close button of the currently running application, the controller 11 determines that the operation using the movement detection apparatus 2 has been completed and ends the sequence of processing (step S112: Yes). When determining that the operation using the movement detection apparatus 2 has not been completed (step S112: No), the controller 11 proceeds to the processing in step S113.

Upon acquiring the barometric pressure data from the movement detection apparatus 2 (for the second time onward) (step S113: Yes), the controller 11 proceeds to the processing in step S114. When barometric pressure data have not been acquired from the movement detection apparatus 2 (step S113: No), the controller 11 returns to the processing in step S112.

The controller 11 calculates the difference between the new barometric pressure data, detected by the barometric pressure sensor 40, of the movement detection apparatus 2 and the new barometric pressure data, detected by the barometric pressure sensor 19, of the electronic device 1 (step S114). In other words, the controller 11 calculates the difference between the barometric pressures.

The controller 11 makes a comparison with the previous difference in barometric pressure and determines whether the new barometric pressures have changed by a value equal to or greater than a threshold (step S115). The threshold may, for example, be the value of a change in barometric pressure corresponding to a difference in height of two centimeters. If the change between the new difference in barometric pressure and the previous difference in barometric pressure is equal to or greater than the threshold (step S115: Yes), the controller 11 proceeds to the processing in step S116. When the change in the new difference in barometric pressure is smaller than the threshold (step S115: No), the controller 11 returns to the processing in step S108.

In accordance with the change from the previous difference in barometric pressure, the controller 11 enlarges or reduces the display screen of the display 14 (step S116). In this embodiment, the controller 11 enlarges the screen if this change represents a larger difference (i.e. if the electronic device 1 and the movement detection apparatus 2 are further apart). The controller 11 reduces the screen if this change represents a smaller difference (i.e. if the electronic device 1 and the movement detection apparatus 2 are closer together). Alternatively, the correspondence between the increase and decrease in the change and the enlargement and reduction of the screen may be the opposite of the above example. The enlargement ratio or reduction ratio may also increase as the change in barometric pressure is greater.

As described above, as compared to an electronic device that uses a proximity sensor, the electronic device 1 can be operated by a gesture (to enlarge or reduce the screen) from a more distant location in this embodiment as well. The electronic device 1 can thus be made more convenient, as in Embodiment 1.

Furthermore, in this embodiment, the change from the previous time in the difference between the barometric pressure detected by the barometric pressure sensor 19 (first barometric pressure sensor) and the barometric pressure detected by the barometric pressure sensor 40 (second barometric pressure sensor) is used in the enlargement and reduction processing, unlike in Embodiment 1. Since the difference in barometric pressure that indicates the relative distance between the electronic device 1 and the movement detection apparatus 2 is used, a high enlargement ratio (or reduction ratio) can be achieved without increasing the sensitivity. Also, when the user moves from the first floor to the second floor while maintaining the distance between the electronic device 1 and the movement detection apparatus 2, no enlargement processing or reduction processing is performed.

Furthermore, in this embodiment, the difference between the barometric pressure detected by the barometric pressure sensor 19 (first barometric pressure sensor) and the barometric pressure detected by the barometric pressure sensor 40 (second barometric pressure sensor) is compared to a predetermined value. If the difference is equal to or greater than the predetermined value (if the electronic device 1 and the movement detection apparatus 2 are separated in the height direction), the mode is switched from the first mode (regular mode) to the second mode with low power consumption (low power mode). If the difference is smaller than the predetermined value (if the electronic device 1 and the movement detection apparatus 2 are brought closer together in the height direction), the mode is switched from the second mode to the first mode. Therefore, the user does not need to perform any manual return process such as picking up the electronic device 1 and pressing a particular key. In other words, the mode can be returned from the second mode to the first mode by a natural operation whereby the user brings the movement detection apparatus 2 (stylus) closer to the electronic device 1 (tablet) when wanting to use the tablet and the stylus. The electronic device 1 can thus be made even more convenient.

(Other Embodiments)

This disclosure is based on the drawings and on embodiments, but it should be noted that a person of ordinary skill in the art could easily make a variety of modifications and adjustments based on this disclosure. Therefore, such changes and modifications are to be understood as included within the scope of this disclosure. For example, the functions and the like included in the various components and steps may be reordered in any logically consistent way. Furthermore, components or steps may be combined into one or divided.

In the above embodiment, sensors other than the barometric pressure sensor 40 cause the display 14 to display a line corresponding to movement of the movement detection apparatus 2. At least a portion of the other sensors, however, may be used for gesture operation of the electronic device 1. In cases such as when the paint software is suspended by the user, the controller 11 may acquire detected data of the acceleration sensor 38. In accordance with motion by the user to the left, right, front, and back, the controller 11 can adjust the screen displayed on the display 14. For example, the screen displayed on the display 14 may be scrolled upward upon the user performing a gesture to raise the hand in the longitudinal direction of the display 14. At this time, the controller 31 may cause the gyro sensor 39 to operate. The controller 11 may adjust the screen displayed on the display 14 in accordance with a rotational movement by the user. Furthermore, the controller 11 is not limited to adjusting the screen displayed on the display 14 and may also receive gesture operations for control of a variety of applications. For example, when the electronic device 1 is at a distance from the user who is wearing the movement detection apparatus 2 and an alarm of the electronic device 1 goes off, the user can turn off the alarm with a gesture. The user who is wearing the movement detection apparatus 2 can also be allowed to place a hands-free call or check e-mail (by display or reading aloud) with a gesture.

In Embodiment 2, the controller 11 switches the mode of the electronic device 1 to the low power mode upon detecting a difference in barometric pressure corresponding to a height of 30 cm. The height of 30 cm, however, is only one non-limiting example. The threshold (predetermined value) for transitioning to the low power mode may be a value corresponding to a greater height than 30 cm, such as 45 cm. At this time, the electronic device 1 operates in the regular mode when the distance between the electronic device 1 and the movement detection apparatus 2 is under 45 cm. For example, the typical range over which an electronic device using a proximity sensor can detect a gesture is approximately 10 cm. By contrast, the electronic device 1 can perform enlargement, reduction, rendering, and the like of the screen in accordance with movement of the movement detection apparatus 2 that is 45 cm away, for example.

Much of the subject matter of the present disclosure is described as a series of operations executed by a computer system and other hardware that can execute program instructions. Examples of the computer system and other hardware include a general-purpose computer, a personal computer (PC), a dedicated computer, a workstation, a personal communications system (PCS), a mobile (cellular) phone, a mobile phone with a data processing function, a radio-frequency identification (RFID) receiver, a game device, an electronic notepad, a laptop computer, a global positioning system (GPS) receiver, and other programmable data processing apparatuses. It should be noted that in each embodiment, various operations and control methods are executed by a dedicated circuit (for example, individual logical gates interconnected in order to execute a particular function) implementing program instructions (software), or by a logical block, program module, or the like executed by one or more processors. The one or more processors that execute a logical block, program module, or the like include, for example, one or more of a microprocessor, CPU, application specific integrated circuit (ASIC), digital signal processor (DSP), programmable logic device (PLD), field programmable gate array (FPGA), processor, controller, microcontroller, microprocessor, electronic device, other apparatus designed to be capable of executing the functions disclosed here, and/or a combination of any of the above. The embodiments disclosed here are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or memory content to or from another code segment or hardware circuit in order for the code segment to connect to another code segment or hardware circuit.

The storage 16 used here may also be configured as a computer-readable, tangible carrier (medium) in the categories of solid-state memory, magnetic disks, and optical discs. Data structures and an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic or optical storage medium, such as a compact disc (CD), laser Disc®, digital versatile disc (DVD®), Floppy® disk, and Blu-ray Disc® (laser disc, DVD, floppy, and Blu-ray disc are registered trademarks in Japan, other countries, or both). Further examples include a portable computer disk, random access memory (RAM), read-only memory (ROM), rewritable programmable ROM such as erasable programmable read-only memory (EPROM), electrically erasable programmable read-only memory (EEPROM), or flash memory, another tangible storage medium that can store information, or a combination of any of these. The memory may be provided internal and/or external to a processor or processing unit. As used in this disclosure, the term "memory" refers to all types of long-term storage, short-term storage, volatile, non-volatile, or other memory. In other words, the "memory" is not limited to a particular type or number. The type of medium on which information is stored is not limited, either.

The invention claimed is:

1. A communication system comprising:
an electronic device and a stylus;
the electronic device including
    a communication interface configured to communicate with the stylus;
    a display; and
    a controller configured to cause the display to display a screen, and
the stylus including
    a barometric pressure sensor that detects a change in barometric pressure, wherein
the controller of the electronic device uses the change in barometric pressure to determine a height of the stylus relative to the electronic device, where the height of the stylus relative to the electronic device can exceed a detection range of a proximity sensor of the electronic device,
in response to detecting a change in barometric pressure that exceeds a predetermined threshold, the controller enlarges or reduces the screen on the display in accordance with the change in barometric pressure, and
an enlargement ratio or a reduction ratio of the screen on the display increases as the change in barometric pressure is greater.

2. The communication system of claim 1, wherein the controller enlarges the screen if the change is a rise in barometric pressure and reduces the screen if the change is a drop in barometric pressure.

3. The communication system of claim 1, wherein the controller enlarges the screen if the change is a drop in barometric pressure and reduces the screen if the change is a rise in barometric pressure.

4. A communication system comprising:
an electronic device and a stylus;
the electronic device including
    a communication interface configured to communicate with the stylus;
    a display; and
    a controller configured to cause the display to display a screen, and
the stylus including
    a barometric pressure sensor that detects a change in barometric pressure; and
    another sensor differing from the barometric pressure sensor, wherein
the controller of the electronic device uses the change in barometric pressure to determine a height of the stylus relative to the electronic device, where the height of the stylus relative to the electronic device can exceed a detection range of a proximity sensor of the electronic device
in response to detecting a change in barometric pressure that exceeds a predetermined threshold, the controller causes the display to display a line corresponding to a movement of the stylus detected by the other sensor,
the controller changes a thickness of the line on the display in accordance with the change in barometric pressure, and
the thickness increases as the change in barometric pressure increases.

5. A communication system comprising:
an electronic device and a stylus;
the electronic device including
    a first barometric pressure sensor;
    a communication interface configured to communicate with the stylus; and
    a controller configured to switch between a first mode and a second mode with lower power consumption than the first mode, and
the stylus including
    a second barometric pressure sensor, wherein
the controller switches from the second mode to the first mode if a difference between a barometric pressure detected by the first barometric pressure sensor and a barometric pressure detected by the second barometric pressure sensor, the difference indicating a height of the stylus relative to the electronic device, where the height of the stylus relative to the electronic device can exceed a detection range of a proximity sensor of the electronic device, is smaller than a predetermined value, and
the second mode is a mode for operating the controller at low speed.

* * * * *